United States Patent [19]

Bernard et al.

[11] Patent Number: 4,658,755
[45] Date of Patent: Apr. 21, 1987

[54] METHOD FOR FILTRATION OF COATINGS

[75] Inventors: Edward G. Bernard, Pomona; Francis K. Kochesky, Newburgh, both of N.Y.

[73] Assignee: American Felt & Filter Company, Newburgh, N.Y.

[21] Appl. No.: 687,827

[22] Filed: Dec. 31, 1984

[51] Int. Cl.$^4$ .............................................. B01D 25/04
[52] U.S. Cl. ................................. 118/610; 210/491; 118/603; 118/300
[58] Field of Search ............... 210/503, 491; 118/610, 118/300, 603

[56] References Cited

U.S. PATENT DOCUMENTS

| | | | |
|---|---|---|---|
| 3,003,643 | 10/1961 | Thomas | 210/491 |
| 3,814,261 | 6/1974 | Morgan | 210/491 X |
| 4,104,170 | 8/1978 | Nedza | 210/491 X |
| 4,539,116 | 9/1985 | Morin | 118/610 X |

FOREIGN PATENT DOCUMENTS 2600228  7/1976  Fed. Rep. of Germany ...... 210/491

Primary Examiner—Shrive P. Beck
Attorney, Agent, or Firm—Robin, Blecker & Daley

[57] ABSTRACT

A method for in-line filtration of flowing liquids wherein composite filtering of mechanical entrapment type and of absorptive character is implemented in relative measures adapted to meet both flow rate and contaminant filtration requirements. The invention effects jointly operative steps of mechanical and absorptive oil-based contaminant removal with accommodation of desired flow rate of automotive coating liquid by a practice wherein these two filtration techniques are effected concurrently throughout a length of conduit assigned to filtering. The invention is practiced through the use of a fibrous body, comprised in first part of oil-absorptive fiber and in second part of fibrous matter substantially non-absorptive to oil-contaminants, the second part fibrous matter being arranged to selectively entrap oil contaminants and prevent absorption thereof by such oil-absorptive fiber.

7 Claims, 5 Drawing Figures 4,658,755

METHOD FOR FILTRATION OF COATINGS

FIELD OF THE INVENTION

This invention relates generally to the filtration of liquids and pertains more particularly to the removal by filtration of oil and related contaminants from coatings.

BACKGROUND OF THE INVENTION

Recently applicable automotive paint finishing standards of increased severity as to protection of underlying metals from environmental attack and the ever increasing use of paints having limited contaminant dissolving capability are factors which have heightened automotive industry attention to improved filtration measures. Long recognized in the art is the propensity of auto finishes to exhibit voids or skips therein where oil, grease or chemically related matter is present in finish-detractive amount in paints applied to automobile bodies.

The automobile industry has heretofore looked to contaminant absorptive filters, disposed in on-line fluid flow communication with a pressurized coatings supply for on-line contaminant removal. Coatings application is typically performed by electrodeposition downstream of the filters. The filters are thus in-line with the electrodeposition equipment and have been constituted of a layer of one-hundred percent microfiber (very fine) polyolefin. This material, widely known for its high oil-absorptive properties, has had extensive past use in the static (non-flowing) pickup of oil from bodies of waters, e. g., as in the case of oil spills. Typically, a sheet of such material is cycled into oil-contaminated area at a rate commensurate with its oil-absorptive capacity, then into an oil scavenging or disposal station and then is disposed of or recycled into the contaminated area in refreshed absorptive character.

Application of this know oil absorptive material to commercially-required dynamic coatings flow in the automotive industry has occasioned severe flow rate reduction. The material is substantially interruptive of flow in short time periods, fiber plugs clogging very rapidly.

SUMMARY OF THE INVENTION

The present invention has as its primary objective improved in-line filtration of flowing liquids.

A particular object of the invention is the provision of improved methods for in-line filtration of automobile finishing paints having oil, grease or chemically-related contaminant content.

In attaining the foregoing and other objects, the invention provides a method of in-line filtration of flowing liquids wherein composite filtering of mechanical entrapment type and of absorptive character is implemented in relative measures adapted to meet both flow rate and contaminanat filtration requirements.

In preferred practice, the invention effects jointly operative steps of mechanical and absorptive oil-based contaminant removal with accommodation of desired flow rate of automotive coating liquid by a practice wherein these two filtration techniques are effected concurrently throughout a length of conduit assigned to filtering. The concentration of contaminant in the flow decreases generally uniformly with increasing location in the flow direction by reason on the concurrent and repetitive occurrences of entrapment and absorption with flow location. The result is that the filter has extended performance time at required flow rate over that of the prior art.

As discussed in detail below, the invention is practiced through the use of a fibrous body, comprised in first part of oil-absorptive fiber, such as of prior art type above discussed, and in second part of fibrous matter substantially non-absorptive to oil contaminants, the interfiber spacing of such second part fibrous matter being such as to selectively entrap oil contaminants and prevent absorption thereof by such oil-absorptive fiber and attendant ready clogging of the filter.

A preferred system in accordance with the invention for operation at required filtration level and filtered coating delivery rate includes a pressurized supply of unfiltered coating, a plurality of cavities, each including therein a filter in the form of a bag having a fibrous body of the above discussed type. A first conduit arrangement connects the inputs of the cavities in parallel to be fed in common from the pressurized supply of coating. A second conduit arrangement connects the outputs of the cavities in common to collectively feed the coating application apparatus.

The foregoing and other objects and features of the invention will be further understood from the ensuing detailed description of preferred practices thereof and from the drawsings wherein like reference numerals identify like parts throughout.

DESCRIPTION OF PREFERRED EMBODIMENTS AND PRACTICES

Figure 1:
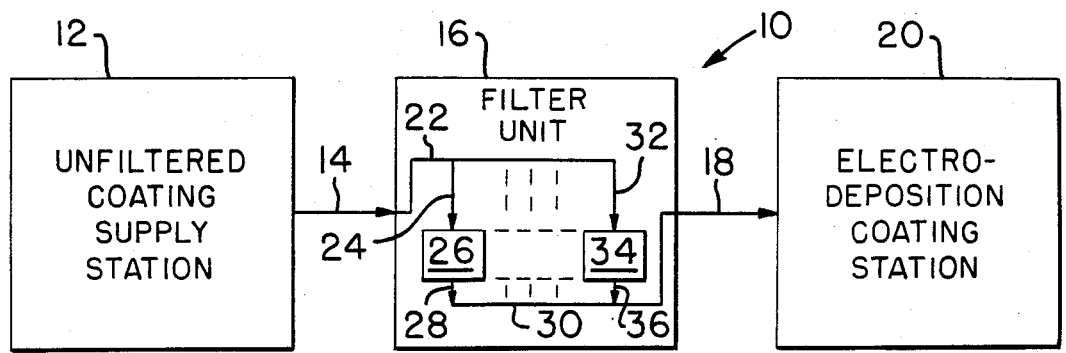
FIG. 1 is a schematic block diagram of a prior art on-line automobile coating line.

Referring to FIG. 1, the schematic block diagram is of a prior art automobile coating line 10 including an unfiltered coating supply station 12, conduit 14, filter unit 16 and electrodeposition coating station 20.

Conduit 14 feeds input conduit 22 in filter unit 16. Conduit 22 in turn feeds tap conduit 24 terminating in filter unit cavity 24. The output of cavity 26 is fed over conduit 28 to filter unit output conduit 30 which issues into conduit 18. Numerous such cavities are provided in parallel manner by a suitable first conduit arrangement, e.g., a second tap conduit 32, a second cavity 34 and cavity output conduit 36 being illustrated in FIG. 1, the broken lines indicating the presence of still other cavities.

The arrangement of filter unit 16 is such as to effect a subdivision of pressurized coating flow in conduit 14 into flow portions corresponding to the number of cavities employed. Desirably, each cavity will contain a filter and require removal of contaminants would occur commensurately with required input flow rate to conduit 18 and hence to coating station 10. Further, flow desirably would be selectively interruptable in any of the tap conduits for filter replacement or other servicing, with loss of only that portion of total flow. It is also contemplated with the arrangement of filter unit 16 that input flow to the cavities remaining on-line could be increased during such individual cavity down-time to maintain required output flow rate.

Industry experience with the FIG. 1 system and its method, when using the above-noted full polyolefin fiber filter in bag form in all cavities (ten or more) is that the highly oil-absorptive, very fine fiber plugs very rapidly. This allows very little flow, impractical to the extent that practice, preceding the subject invention, is modified from that above described and desired, such as to use the full polyolefin fiber filter bags only in a few cavities with the hope that some flow would result through the bagged cavities with some degree of filtration thus obtained. Required flow rate is accordingly achieved only at the expense of less than desired filtration.

Figure 2:
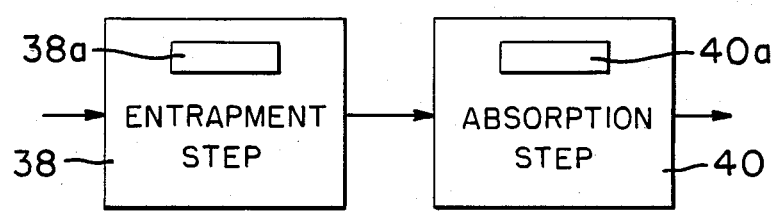
FIG. 2 is a flow diagram of the filtration practice of the invention.

Referring to FIG. 2, applicant's filtering practice is to apportion filtration, throughout the streamwise extent of the total flow path assigned to filtration, to separate diverse and recurrently operative filtration steps, step 38 being effected by use of an entrapment element or matrix 38a disussed below, and step 40 being conducted with use of an absorptive element or matrix 40a. The entrapment element 38a functions to separate, from the coating flow, particles, especially oil, of size exceeding the interspacing of its fibers. Such entrapment element is selected to be highly non-absorptive to oil and related contaminants, e.g., grease, and may be constituted of standard cardable fibers, i. e., fibers which are readily disentangled and collected together by the use of a card, such as rayon fibers. The absorptive element may be constituted of the highly absorptive very fine polyolefin fiber of the prior art and above discussed.

Steps 38 and 40 may also be characterized as involving upstream and downstream aspects of practice. While physical streamwise separation of the entrapment and absorption element is within the contemplation of the invention, both elements are preferably densely located in a mixture or blend throughout the streamwise extent of the total flow path assigned to filtration. The upstream-downstream characterization is intended to convey aspects of the invention whereby (1) there are absorption steps practiced upon flow from which particulate contaminant previously has been removed by practice of entrapment steps, (2) such diverse filtration steps of entrapment and absorption are effected repetitiously and concurrently throughout the streamwise extent of the total flow path assigned to filtration, and (3) there is effected a generally uniform decrease with increasing location in such streamwise extent of the concentration of oil and chemically related matter in the flowing medium. Items (1)–(3) are found to lead to the filtration efficiency at hand. Most desirable is an intimate blending of two diversely functioning fibrous matrices of elements 38a and 40a, per filter making method discussed hereinafter.

Figures 3, 4:
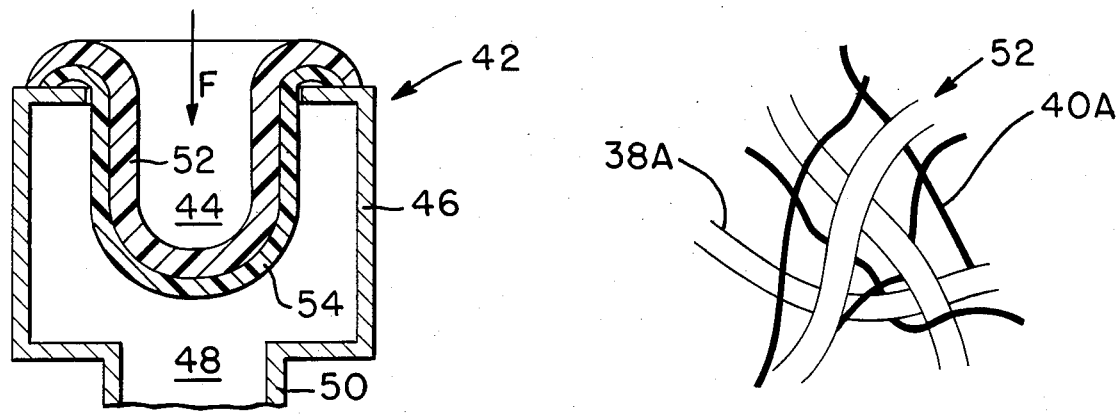
FIG. 3 is a central sectional view of filtration apparatus of the invention.
FIG. 4 is a sectional drawing of a fibrous matrix for use in the FIG. 3 filtration apparatus.

Referring now to FIG. 3, an embodiment of cavity 42 is shown in accordance with the invention for use in place of cavities 26, 34, etc., of the FIG. 1 prior art system. Filter bag 44 is suitably secured to cavity wall 46, the direction of fluid flow being indicated by arrow F. Outlet port 46 of cavity 42 communicates with conduit 30 of FIG. 1 through outlet conduit 50. Fibrous body 52, comprising the diversely functioning elements 38a and 40a of steps 38 and 40 is a composite layer which is sewn or otherwise secured to bag support layer 54, which may be of any suitable material porous to permit free and unfiltered flow of the liquid medium therethrough.

Fibrous body 52, in preferred compostion, comprises twenty to forty percent of element 40a, microfiber polyolefin, the remnant being of element 38a, rayon viscose of five and one-half denier, the mixture having weight of eight to twelve ounces per square yard and thickness of one hundred and fifty to two hundred and fifty mils.

In preparing the fibrous body 52, the element 40a microfiber polyolefin is taken in sheeted form and chopped to fiber lengths below six inches. The cut sheets are then blended with element 38a five and one-half denier rayon viscose or any of several other cardable fibers. The blend is rough carded to fibrilate the sheets and further of element 38a is added to bring the blend to final percentage. This blend is then carded and needled into the final fibrous body 52.

The resulting fibrous body 52 (FIG. 4) comprises a random entanglement of elements 40a and 38a. Element 40a has a fiber diameter of five microns and less. Element 38a typically has a fiber diameter of twenty to twenty-five microns, but can be varied from ten to sixty microns.

Suitable ranges for fibrous body 52 are as follows. Element 40a may comprise from ten to eighty percent of the matrix. Weight may range from four to forty ounces for the body and thickness may be from twenty to five hundred mils.

Figure 5:
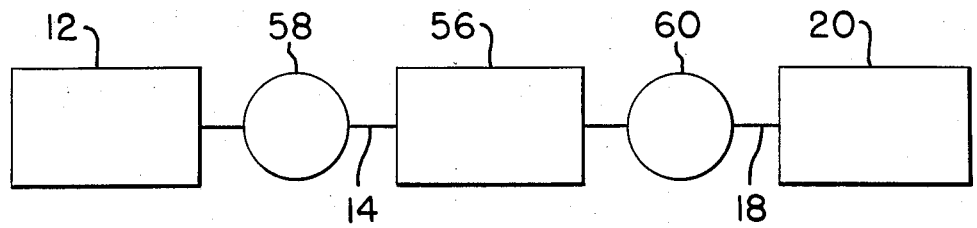
FIG. 5 is a schematic block diagram of an on-line automobile coating line in accordance with the invention.

It is found in practice in accordance with the invention that one may place the FIG. 3 filter bag 42 in each of the ten or more cavities of the FIG. 1 system without rapid filter clogging and meet the required filtered coating flow to the coating station. Referring to FIG. 5, pressurized unfiltered coating supply station 12 is coupled over conduit 14 to filter unit 56, constructed to include filter bag 42 (FIG. 3) in each of its multiple cavities. Interposed serially in conduit 14 is flow regulator 58. Flow regulator 60 is interposed in conduit 18, between filter unit 56 and coating station 20. Regulator 58 is set at a sufficiently higher flow rate than regulator 60 to accommodate a flow rate required at coating station 12 commensurate with entrapment and absorption occurring in each of the cavities of the filter unit 56.

By way of example of performance, a field test was run on an automotive plant paint coating line. A stream of approximately two hundred gallons per minute (gpm) was diverted through two filter bags, each having fibrous body 52. The flow continued uninterrupted for seven days (one hundred and sixty-eight hours) without clogging. After the seven days (normal change out time), the bags 42 were removed. The run met requirements in that fewer defects from oil contamination on the thus painted auto bodies were reported. Chemical analysis of the fibrous bodies 52 showed oil entrapment and absorption. A like test using the previously used filter bags above discussed and including only the oil absorption fiber showed bag clogging within a few hours.

Various changes to the specifically described practice and modifications to the illustrated system and filtration apparatus may be made without departing from the invention, Accordingly, it is to be understood that the particularly detailed preferred embodiments and practices is intended in an illustrative and not in a limiting sense. The true spirit and scope of the invention is set forth in the following claims.

We claim:

1. A system for automotive coating application, comprising:
   (a) a source of pressurized coating;
   (b) coating application apparatus;
   (c) conduit means for providing fluid flow communication between said coating source and said coating application apparatus; and
   (d) filtering means diposed in a preselected length of said conduit means for effecting jointly along said length oil absorption and oil particle removal from said coating in the course of coating flow through such conduit means length, wherein said filtering means comprises a mixture of first fibrous matter having a high degreee of absorption for said oil and second fibrous matter having substantially no absorption for said oil.

2. The system claimed in claim 1 wherein said conduit means includes a plurality of such conduit means preselected lengths arranged in parallel, an individual one of said means (d) being disposed in each of said parallel lengths of said conduit means.

3. The system claimed in claim 1 wherein said filtering means comprises a mixture of said first and second fibrous matters.

4. The system claimed in claim 1 wherein said first fibrous matter is comprised of polyolefin fibers of microfiber dimension.

5. The system claimed in claim 1 wherein said second fibrous matter is comprised of cardable fibers.

6. The system claimed in claim 5 wherein said cardable fiber is rayon.

7. The system claimed in claim 1 wherein said first fibrous matter is comprised of polyolefin fibers of microfiber dimension and wherein said second fibrous matter is comprised of cardable fibers.

* * * * *

UNITED STATES PATENT AND TRADEMARK OFFICE
CERTIFICATE OF CORRECTION

PATENT NO. : 4,658,755

DATED : April 21, 1987

INVENTOR(S) : Edward G. Bernard et al.

It is certified that error appears in the above-identified patent and that said Letters Patent is hereby corrected as shown below:

In [75] "Francis K. Kochesky" should read -- Francis F. Kochesky --. Column 1, line 38 "know" should read -- known --. Column 2, line 63 "require" should read -- required --. Column 2, line 65, "10" should read -- 20 --. Column 3, line 8, "very" 2nd occurrence should read -- vary --. Column 5, line 14, "degreee" should read -- degree --. Column 6, lines 4-6, cancel claim 3. Column 6, line 7, "4" should read -- 3 --. Column 6, line 10, "5" should read -- 4 --. Column 6, line 12, "6" should read -- 5 -- and "5" should read -- 4 --. Column 6, line 14, "7" should read -- 6 --.

Signed and Sealed this

Eighth Day of September, 1987

Attest:

DONALD J. QUIGG

Attesting Officer

Commissioner of Patents and Trademarks